(12) United States Patent
Mikami

(10) Patent No.: US 10,581,551 B2
(45) Date of Patent: Mar. 3, 2020

(54) OPTICAL REPEATER AND CONTROL METHOD FOR OPTICAL REPEATER

(71) Applicant: NEC Corporation, Minato-ku, Tokyo (JP)

(72) Inventor: Satoshi Mikami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/761,449

(22) PCT Filed: Sep. 15, 2016

(86) PCT No.: PCT/JP2016/004217
§ 371 (c)(1),
(2) Date: Mar. 20, 2018

(87) PCT Pub. No.: WO2017/056438
PCT Pub. Date: Apr. 6, 2017

(65) Prior Publication Data
US 2019/0052390 A1 Feb. 14, 2019

(30) Foreign Application Priority Data
Sep. 29, 2015 (JP) ................. 2015-190597

(51) Int. Cl.
*H04B 10/00* (2013.01)
*H04J 14/02* (2006.01)
*H04B 10/291* (2013.01)

(52) U.S. Cl.
CPC ........ *H04J 14/0221* (2013.01); *H04B 10/291* (2013.01)

(58) Field of Classification Search
CPC .... H04J 14/0221; H04J 14/0213; H04J 14/02; H04J 14/0205; H04B 10/291;
(Continued)

(56) References Cited

U.S. PATENT DOCUMENTS 5,315,674 A * 5/1994 Asako .................. H04B 10/035
385/15
5,455,704 A * 10/1995 Mizuochi .......... H01S 3/094003
359/341.33
(Continued)

FOREIGN PATENT DOCUMENTS

CN 1233868 A 11/1999
CN 1384567 A 12/2002
(Continued)

OTHER PUBLICATIONS

A. Mars Ning Guo et al., "Bidirectional C+L Band Hybrid Amplifier for 16-Channel WDM PON Transmission at 10Gb/s", 15th OptoElectronics and Communications Conference (OECC2010) Technical Digest, Jul. 2010, Sapporo Convention Center, Japan, pp. 262-263, XP031764856 (2 pages total).
(Continued)

*Primary Examiner* — Hibret A Woldekidan

(57) ABSTRACT

In order to provide a compact and low power consumption optical repeater capable of amplifying a plurality of wavelength ranges, the optical repeater is provided with: an excitation means which generates excitation light in a single wavelength range; a first light amplification means which is excited by the excitation light and the amplification band of which is a first wavelength range; and a second light amplification means which is excited by the excitation light and the amplification band of which is a second wavelength range different from the first wavelength range.

12 Claims, 6 Drawing Sheets

(58) Field of Classification Search
CPC ............ H04B 10/0777; H04B 10/2916; H04B 10/2931; H04B 10/2935; H04B 10/2942; H04B 2210/003; H04B 10/29; H04B 10/2918; H04B 10/297; H04B 10/2978; H01S 3/10015; H01S 3/1301; H01S 3/06754; H01S 3/094003; H01S 3/094061; H01S 3/10007; H04Q 2011/0016; H04Q 2011/0018
USPC ..... 398/97, 79, 68, 192, 193, 195, 196, 197, 398/173, 175, 62, 64, 160, 105, 181
See application file for complete search history.

(56) References Cited

U.S. PATENT DOCUMENTS

| | | | | |
|---|---|---|---|---|
| 5,995,254 A * | 11/1999 | Koga | ............... | H04B 10/07 398/1 |
| 6,104,527 A * | 8/2000 | Yang | ............... | H01S 3/06754 359/341.33 |
| 6,496,300 B2 * | 12/2002 | Kinoshita | ............... | H01S 3/06758 359/337.1 |
| 6,549,315 B1 * | 4/2003 | Kakui | ............... | H04B 10/294 359/341.2 |
| 6,618,193 B1 * | 9/2003 | Boertjes | ............... | H04B 10/291 359/337 |
| 6,868,204 B2 * | 3/2005 | Yokoyama | ............... | H04B 10/071 359/341.1 |
| 6,919,987 B2 * | 7/2005 | Takatsu | ............... | G06F 12/0866 359/333 |
| 6,922,282 B2 * | 7/2005 | Onaka | ............... | H01S 3/06758 359/341.32 |
| 7,042,636 B2 * | 5/2006 | Hayashi | ............... | H01S 3/1301 359/334 |
| 7,123,405 B2 * | 10/2006 | Yokoyama | ............... | H04B 10/071 359/341.2 |
| 7,362,499 B2 * | 4/2008 | Hayashi | ............... | H01S 3/1301 359/334 |
| 9,124,362 B2 * | 9/2015 | Grasso | ............... | H04B 10/2918 |
| 9,276,672 B2 * | 3/2016 | Zhang | ............... | H04B 10/071 |
| 2002/0003644 A1 * | 1/2002 | Shimomura | ............... | H04J 14/0204 398/87 |
| 2005/0069319 A1 * | 3/2005 | Pfeiffer | ............... | H04B 10/2939 398/72 |
| 2005/0078358 A1 * | 4/2005 | Sato | ............... | H01S 3/06758 359/337.4 |
| 2011/0085231 A1 * | 4/2011 | Bolshtyansky | ..... | H01S 3/06754 359/341.33 |
| 2013/0121693 A1 * | 5/2013 | Tanaka | ............... | H04J 14/0221 398/48 |
| 2019/0097729 A1 * | 3/2019 | Yang | ............... | H04M 1/026 |

FOREIGN PATENT DOCUMENTS

| | | |
|---|---|---|
| CN | 1601935 A | 3/2005 |
| CN | 1917307 A | 2/2007 |
| EP | 1 130 820 A2 | 9/2001 |
| JP | 2001-24594 A | 1/2001 |
| JP | 2001-203644 A | 7/2001 |
| JP | 2001-209644 | 8/2001 |
| JP | 2003-283019 A | 10/2003 |
| JP | 2009-81473 A | 4/2009 |
| WO | 02/069528 A2 | 9/2002 |

OTHER PUBLICATIONS

Extended European Search Report dated Aug. 21, 2018 issued by the European Patent Office in counterpart application No. 16850619.4.

Fujiwara et al., "Compact Bi-Directional EDFAs to Support Extended Power Budget Class of TWDM-PON", 2015 European Conference on Optical Communication (ECOC), Sep. 27, 2015, pp. 1-3. (3 pages total).

Barnard et al., "Bidirectional Fiber Amplifiers", IEEE Photonics Technology Letters, vol. 4, No. 8, Aug. 1992, pp. 911-913.

Yamada et al., "Ultra Wideband Amplification Technologies for Optical Fiber Amplifiers", Journal of the Institute of Electronics, Information and Communication Engineers, vol. 86, No. 4, Apr. 2003, pp. 234-241.

International Search Report dated Oct. 25, 2016 issued by the International Searching Authority in corresponding application No. PCT/JP2016/004217.

Japanese Office Action for JP Application No. 2017-542717 dated Feb. 12, 2019 with English Translation.

Communication dated Nov. 1, 2019, issued by the China National Intellectual Property Administration in application No. 201680057009.3.

* cited by examiner

OPTICAL REPEATER AND CONTROL METHOD FOR OPTICAL REPEATER

This application is a National Stage Entry of PCT/JP2016/004217 filed on Sep. 15, 2016, which claims priority from Japanese Patent Application 2015-190597 filed on Sep. 29, 2015, the contents of all of which are incorporated herein by reference, in their entirety.

TECHNICAL FIELD

The present invention relates to an optical repeater and a control method for an optical repeater, and relates particularly to an optical repeater including optical amplifiers different for respective wavelength ranges of signal light to be amplified, and a control method for an optical repeater.

BACKGROUND ART

An optical repeater used in an optical submarine cable system is laid on the seabed, and thus, is required to have a small size and low power consumption. Meanwhile, in order to make a capacity of the optical submarine cable system large, an optical repeater capable of amplifying L-band signal light as well as widely used C-band signal light has been studied.

FIG. 6 is a block diagram illustrating a configuration example of an optical repeater 900 related to the present invention. The optical repeater 900 is used in an optical submarine cable system. The optical repeater 900 includes a C-band optical amplifier 91 and an L-band optical amplifier 92. In the present description, the C-band designates a wavelength band of approximately 1530 nm to 1565 nm, and the L-band designates a wavelength band of approximately 1570 nm to 1610 nm.

The C-band optical amplifier 91 includes a control circuit 911, an excitation light source 912, and optical amplification media 913 and 923. The optical amplification media 913 and 923 amplify C-band signal light, with excitation light generated by the excitation light source 912. In order to amplify C-band signal light, four laser diodes (LDs) of a wavelength band of 980 nm are used in the excitation light source 912.

The L-band optical amplifier 92 includes a control circuit 921, an excitation light source 922, and optical amplification media 914 and 924. The optical amplification media 914 and 924 amplify L-band signal light, with excitation light generated by the excitation light source 922. In order to amplify L-band signal light, four lasers of a wavelength band of 1480 nm are used in the excitation light sources 922. Excitation light output from the LDs included in the excitation light sources 912 and 922 excites the optical amplification media 913 and 914 through couplers and multiplexer/demultiplexers.

Signal light of a C-band and an L-band is wavelength-multiplexed and input from an up input (UP IN) in FIG. 6. The input signal light is separated into the C-band and the L-band. The signal light of the C-band is amplified by the optical amplification medium 913, and the signal light of the L-band is amplified by the optical amplification medium 914. The amplified C-band and L-band signal light is wavelength-multiplexed and output from an up output (UP OUT).

Similarly, signal light of a C-band and an L-band input from a down input (DOWN IN) in FIG. 6 is amplified by the optical amplification media 923 and 924. The signal light amplified by the optical amplification media 923 and 924 is output from a down output (DOWN OUT).

Note that in a relation to the present invention, PTLs 1 to 3 describe an optical amplifier including a plurality of optical amplification media.

CITATION LIST

Patent Literature

[PTL 1] Japanese Laid-open Patent Publication No. 2001-024594
[PTL 2] Japanese Laid-open Patent Publication No. 2003-283019
[PTL 3] Japanese Laid-open Patent Publication No. 2009-081473

SUMMARY OF INVENTION

Technical Problem

As illustrated in FIG. 6, the optical repeater 900 includes the C-band optical amplifier 91 and the L-band optical amplifier 92. The optical amplification media 913 and 923 of the C-band optical amplifier 91 and the optical amplification media 914 and 924 of the L-band optical amplifier 92 are excited by using excitation light sources of different wavelengths. For this reason, when an optical repeater including a function of amplification of a C-band and an L-band is simply designed in such a way that the C-band optical amplifier 91 and the L-band optical amplifier 92 are arranged in parallel, the control circuits 911 and 921 and the excitation light sources 912 and 922 are necessary independently for the respective wavelength bands. In other words, adding the L-band optical amplifier 92 causes a scale of the optical amplifier to become twice that of an optical repeater dedicated to the C-band. As a result, there arises a problem that a size and power consumption of the optical repeater 900 is remarkably increased.

An optical amplifier described in PTL 1 uses excitation light sources different for respective wavelength bands of signal light. For this reason, there is a problem that a size and power consumption of the optical amplifier is large similarly to the optical repeater 900. PTLs 2 and 3 describe a configuration of an optical amplifier in which optical amplification media are connected in series. However, PTLs 2 and 3 do not disclose a configuration for making amplification on a plurality of wavelength bands while suppressing increase in size and power consumption.

OBJECT OF THE INVENTION

An object of the present invention is to provide an optical repeater that is small in size and power consumption and that is capable of making amplification on a plurality of wavelength bands, and a control method therefor.

Solution to Problem

An optical repeater according to the present invention includes: an excitation means for generating excitation light of a single wavelength band; a first optical amplification means that is excited by the excitation light and of which amplification band is a first wavelength band; and a second optical amplification means that is excited by the excitation light and of which amplification band is a second wavelength band different from the first wavelength band.

A control method for an optical repeater according to the present invention includes: generating excitation light of a single wavelength band; exciting, with the excitation light, a first optical amplification means of which amplification band is a first wavelength band; and exciting, with the excitation light, a second optical amplification means of which amplification band is a second wavelength band different from the first wavelength band.

Advantageous Effects of Invention

The present invention provides an optical repeater that is small in size and power consumption and is capable of making amplification on a plurality of wavelength bands.

DESCRIPTION OF EMBODIMENTS

First Example Embodiment

Figure 1:
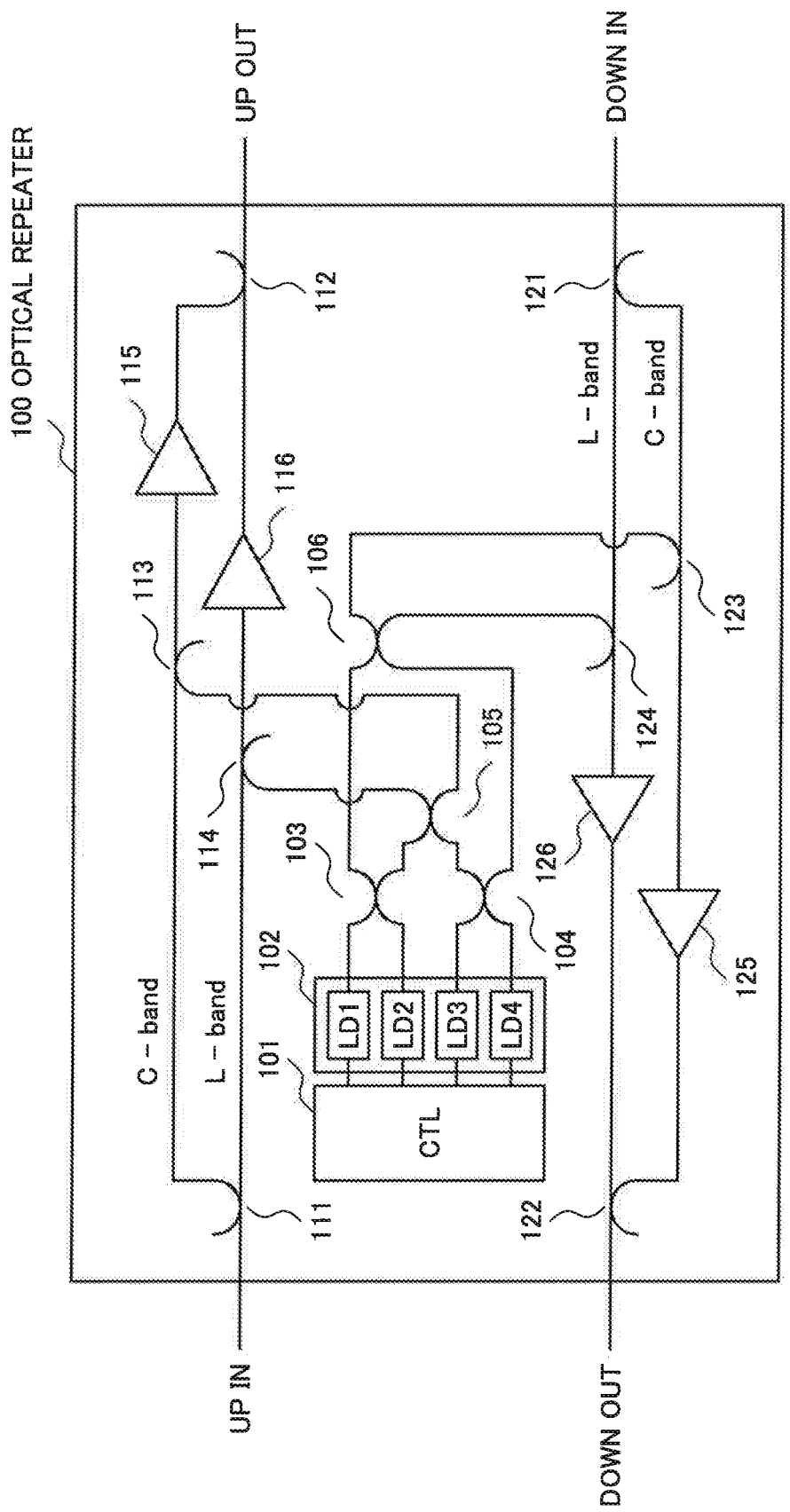
FIG. 1 is a block diagram illustrating a configuration example of an optical repeater 100 according to a first example embodiment.

FIG. 1 is a block diagram illustrating a configuration example of an optical repeater 100 according to a first example embodiment of the present invention. The optical repeater 100 is used in an optical submarine cable system that makes amplification on wavelength bands of both a C-band and an L-band. "UP IN" and "UP OUT" in FIG. 1 respectively represents input and output of signal light in an up direction (from left to right in FIG. 1). "DOWN IN" and "DOWN OUT" in FIG. 1 respectively represents input and output of signal light in a down direction (from right to left in FIG. 1).

The optical repeater 100 includes a control circuit (a controller, CTL) 101, an excitation light source 102, couplers 103 to 106, multiplexer/demultiplexers 111 to 114 and 121 to 124, and optical amplification media 115, 116, 125, and 126.

The control circuit 101 and the excitation light source 102 are used in common for C-band amplification and L-band amplification. The excitation light source 102 generates excitation light for exciting the optical amplification media 115, 116, 125, and 126. The excitation light source 102 includes laser diodes (LDs) 1 to 4 that are four laser diodes of a band of 980 nm. The control circuit 101 controls the excitation light source 102. The control circuit 101 may include a function of individually controlling the LDs 1 to 4 in such a way that output power of the LDs 1 to 4 becomes a predetermined value. Excitation light output by the LD 1 and the LD 2 is coupled by the coupler 103. Excitation light output by the LD 3 and the LD 4 is coupled by the coupler 104.

The coupler 103 distributes excitation light output by the LD 1 and the LD 2, to the couplers 105 and 106. The coupler 104 distributes excitation light output by the LD 3 and the LD 4, to the couplers 105 and 106. The coupler 105 couples the excitation light input from one output of the coupler 103 and one output of the coupler 104, divides the coupled excitation light, and outputs the divided excitation lights to the multiplexer/demultiplexers 113 and 114. The coupler 106 couples the excitation light input from the other output of the coupler 103 and the other output of the coupler 104, divides the coupled excitation light, and outputs the divided excitation lights to the multiplexer/demultiplexers 123 and 124.

The multiplexer/demultiplexer 113 outputs excitation light to the optical amplification medium 115 of an up-line C-band. The multiplexer/demultiplexer 114 outputs excitation light to the optical amplification medium 116 of an up-line L-band. The multiplexer/demultiplexer 123 outputs excitation light to the optical amplification medium 125 of a down-line C-band. The multiplexer/demultiplexer 124 outputs excitation light to the optical amplification medium 126 of a down-line L-band.

In the present example embodiment, the couplers 103 to 106 are 2×2 optical couplers with a division ratio of 1:1. The multiplexer/demultiplexers 111, 112, 121, and 122 make demultiplexing or multiplexing of C-band signal light and L-band signal light. The multiplexer/demultiplexers 113 and 123 multiplex C-band signal light and excitation light. The multiplexer/demultiplexers 114 and 124 multiplex L-band signal light and excitation light. As the couplers 103 to 106, optical fiber fused couplers or optical waveguides may be used. As the multiplexer/demultiplexers 111 to 114 and 121 to 124, optical multiplexer/demultiplexers including dielectric multi-layer film filters may be used.

The optical amplification media 115 and 125 are optical fibers for amplifying C-band signal light with excitation light generated by the excitation light source 102. The optical amplification media 116 and 126 are optical fibers for amplifying L-band signal light with excitation light generated by the excitation light source 102. Specifications of the optical amplification media 115, 116, 125, and 126 may be determined in such a way that output power of the optical repeater 100 falls within a predetermined range. Examples of the specifications of the optical amplification media include a dopant concentration.

The multiplexer/demultiplexer 111 separates signal light input from the UP IN, into C-band signal light and L-band signal light. The multiplexer/demultiplexer 113 multiplexes the C-band signal light and excitation light output from one output of the coupler 105, and inputs the multiplexed light to the optical amplification medium 115. The optical amplification medium 115 amplifies the C-band signal light. Similarly, the optical amplification medium 116 amplifies the L-band signal light by using excitation light output from the other output of the coupler 105. The multiplexer/demultiplexer 112 multiplexes the amplified C-band signal light and the amplified L-band signal light, and outputs the multiplexed light from the UP OUT.

The optical repeater 100 amplifies signal light in the down direction as well, similarly to the signal light in the up direction. In other words, the multiplexer/demultiplexer 121 separates the signal light input from the DOWN IN, into C-band signal light and L-band signal light.

The multiplexer/demultiplexer 123 multiplexes the C-band signal light and excitation light output from one output of the coupler 106, and inputs the multiplexed light to the optical amplification medium 125. The optical amplification medium 125 amplifies the C-band signal light. Similarly, the optical amplification medium 126 amplifies the L-band signal light by using excitation light output from the other output of the coupler 106. The multiplexer/demultiplexer 122 multiplexes the amplified C-band signal light and the amplified L-band signal light, and outputs the multiplexed light from the DOWN OUT.

The couplers 103 to 106 of the present example embodiment all have a division ratio of 1:1. Accordingly, assuming that excitation light power of the LDs 1 to 4 is a, b, c, and d, respectively, excitation light power input to each of the optical amplification media 115, 116, 125, and 126 is (a+b+c+d)/4 when excessive losses of the couplers 103 to 106 and the multiplexer/demultiplexers 113, 114, 123, and 124 are ignored.

Figure 6:
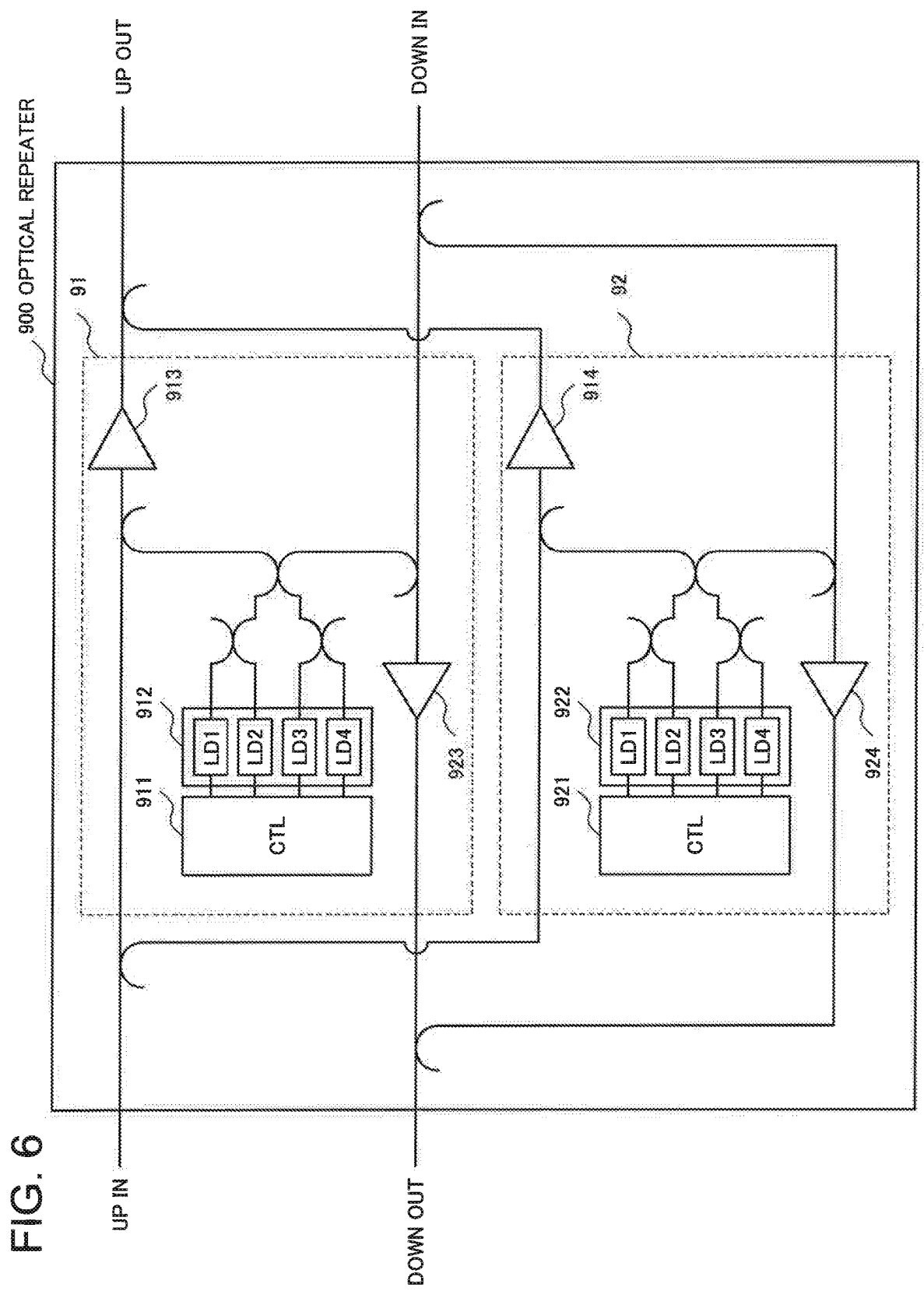
FIG. 6 is a block diagram illustrating a configuration example of an optical repeater 900 related to the present invention.

In a general C-band optical amplifier, an excitation light source of a band of 980 nm is used, and in a general L-band optical amplifier, excitation light of a wavelength of 1480 nm is used. In contrast to this, in the optical repeater 100 of the first example embodiment, the optical amplification media 116 and 126 for the L-band are excited by using also the 980 nm-band LD that is an excitation light source for the C-band. As a result, the optical repeater 100 can simultaneously amplify C-band signal light and L-band signal light by using the same excitation light source. The optical repeater 100 uses the excitation light source in common for the C-band and the L-band, so that sizes and power consumption of the control circuit 101 and the excitation light source 102 can be made smaller compared with those of a configuration (for example, the optical repeater 900 in FIG. 6) including control circuits and excitation light sources for respective wavelength bands.

In this manner, by using the couplers, the optical repeater 100 according to the first example embodiment distributes excitation light of a single wavelength band, to a plurality of the optical amplification media (for example, the optical amplification media 115 and 116) that differ in a wavelength band for amplification. As a result, scales of the control circuit 101 and the excitation light source 102 are reduced, and a size and power consumption of the optical repeater 100 can be made small.

Second Example Embodiment

In a second example embodiment, description is made on an optical repeater capable of changing division ratios of couplers, and thereby providing excitation light of different power to respective optical amplification media (for example, an optical amplification medium for a C-band and an optical amplification medium for an L-band) that need different excitation light power for securing predetermined optical power.

Figure 2:
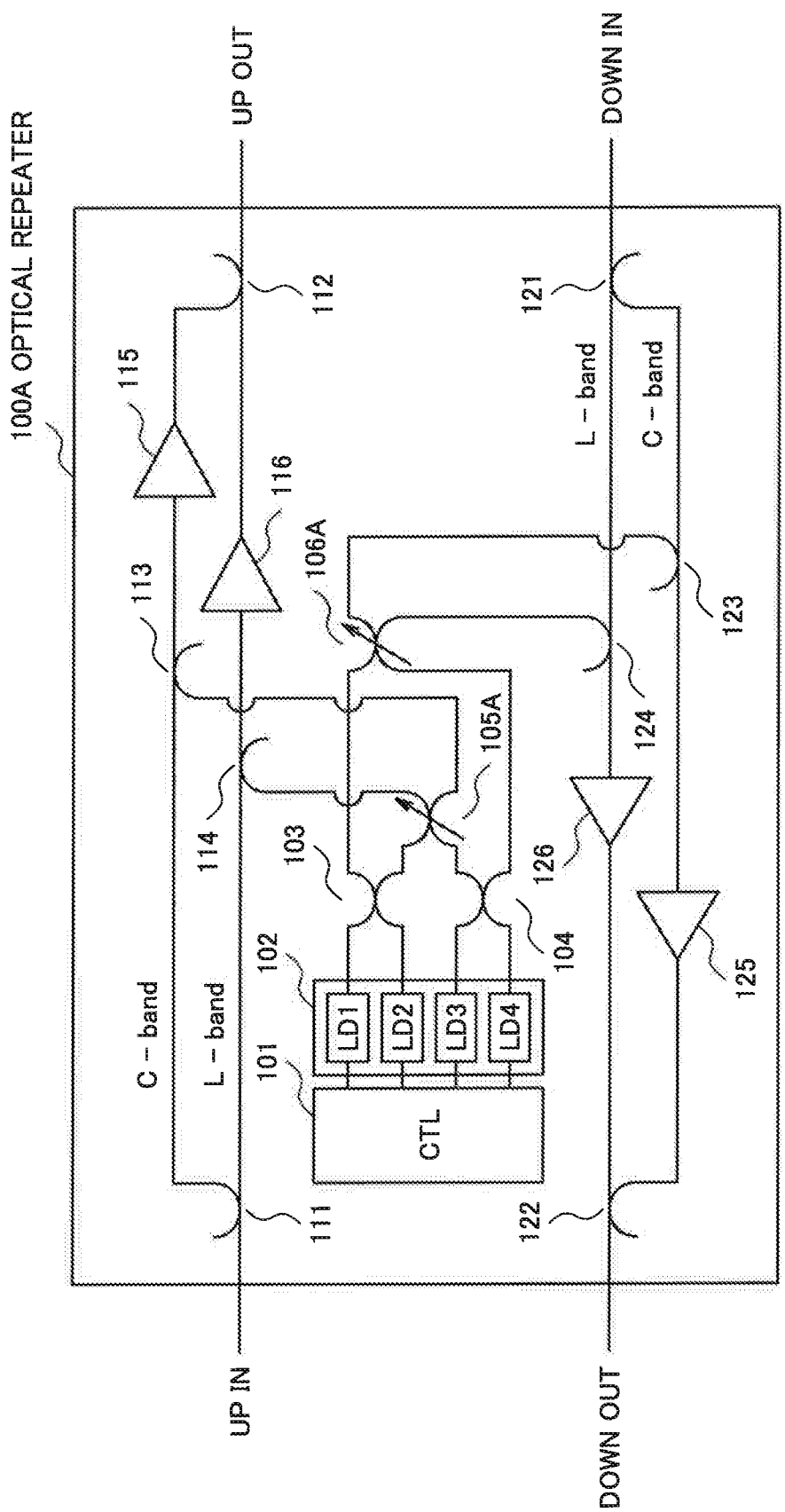
FIG. 2 is a block diagram illustrating a configuration example of an optical repeater 100A according to a second example embodiment.

FIG. 2 is a block diagram illustrating a configuration example of an optical repeater 100A according to the second example embodiment of the present invention. Similarly to the optical repeater 100 according to the first example embodiment, the optical repeater 100A is used in an optical submarine cable system that amplifies wavelength bands of both a C-band and an L-band.

The optical repeater 100A differs from the optical repeater 100 according to the first example embodiment in including couplers 105A and 106A instead of the couplers 105 and 106. Since a configuration of the optical repeater 100A is the same as that of the optical repeater 100 except for the couplers 105A and 106A, description of the already described elements is appropriately omitted hereinafter.

The optical repeater 100A includes a control circuit 101, an excitation light source 102, couplers 103, 104, 105A, and 106A, multiplexer/demultiplexers 111 to 114 and 121 to 124, and optical amplification media 115, 116, 125, and 126.

Excitation light of two LDs (an LD 1 and an LD 2) in the excitation light source 102 is coupled by the coupler 103, and the respective output pieces of light are distributed to the couplers 105A and 106A. Excitation light of an LD 3 and an LD 4 is coupled by the coupler 104, and the respective output pieces of light are distributed to the couplers 105A and 106A. The coupler 105A divides the excitation light, and outputs the divided light to the multiplexer/demultiplexers 113 and 114. The coupler 106A divides the excitation light, and outputs the divided light to the multiplexer/demultiplexers 123 and 124.

The couplers 105A and 106A are variable division-ratio couplers of which division ratios can be controlled from the outside. For example, there is known a variable division-ratio coupler in which an interferometer is applied. Division ratios of the couplers 105A and 106A may be controlled by an electric signal output from the control circuit 101. Controlling a division ratio of the coupler 105A enables control of a distribution ratio of excitation light to the optical amplification medium 115 for the C-band and the optical amplification medium 116 for the L-band. Similarly, controlling a division ratio of the coupler 106A enables control of a distribution ratio of excitation light to the optical amplification medium 125 for the C-band and the optical amplification medium 126 for the L-band.

Since the wavelength band of the signal light to be amplified differs between the C-band and the L-band, excitation light power for securing predetermined optical output sometimes differs between the optical amplification media 115 and 116. The optical repeater 100A according to the present example embodiment can supply excitation light of different power to the optical amplification media 115 and 116 respectively, by controlling a division ratio of the coupler 105A. For example, by controlling a division ratio of the coupler 105A in such a way that powers of the amplified signal lights of the C-band and the L-band match each other, it is possible to suppress the variation in power of signal light between the respective wavelength bands that is based on difference in amplification characteristics between the optical amplification media 115 and 116.

In order to detect the power of the amplified signal light of the C-band and the power of the amplified signal light of the L-band, a tap and a light reception element may be provided at each output of the optical amplification media 115 and 116. The light reception element receives signal light divided by the tap, and outputs a current of magnitude corresponding to each output power of the optical amplification media 115 and 116. In this case, the control circuit 101 may control a division ratio of the coupler 105A, based on the powers of the signal lights of the C-band and the L-band detected by the light reception element. For example, the control circuit 101 controls a division ratio of the coupler 105A in such a way that the power of the signal light of the C-band and the power of the signal light of the L-band become equal to each other.

Alternatively, the control circuit 101 may previously store a relation of a driven state of the excitation light source 102 as well as a division ratio of the coupler 105A with output power or gain of the optical amplification media 115 and 116. The control circuit 101 may control a division ratio of the coupler 105A and excitation light power of the excitation light source 102 in such a way that the optical amplification media 115 and 116 each operate with predetermined output power or gain.

Also in a down line, the control circuit 101 controls a division ratio of the coupler 106A and excitation light power of the excitation light source 102 so that the optical amplification media 125 and 126 can be each controlled in such a way as to operate with predetermined output power or gain. During operation of the optical repeater 100A, division ratios of the couplers 105A and 106A may be changed by the control circuit 101 that has received an instruction through a not-illustrated path from the outside of the optical repeater 100A.

As described above, in the optical repeater 100A according to the second example embodiment, the optical amplification media 116 and 126 for the L-band are excited by using a 980 nm-band LD that is an excitation light source for the C-band. For this reason, similarly to the optical repeater 100 according to the first example embodiment, in the optical repeater 100A, a size and power consumption of the optical repeater can be made small.

Further, in the optical repeater 100A according to the present example embodiment, the couplers 105A and 106A with variable division ratios are used. By such a configuration, excitation light of different power can be supplied to the respective optical amplification media of different wavelength bands. As a result, the optical repeater 100A according to the present example embodiment can suppress variation in output power or gain based on difference in amplification characteristics between the optical amplification media 115 to 116 and 125 to 126.

Third Example Embodiment

In the second example embodiment, the description is made above on the configuration in which the optical amplification media are excited with excitation light power different between the C-band and the L-band, by using the couplers 105A and 106A. In a third example embodiment, description is made on a configuration in which excitation light of power different between an up line and a down line is provided by changing division ratios of couplers.

Figure 3:
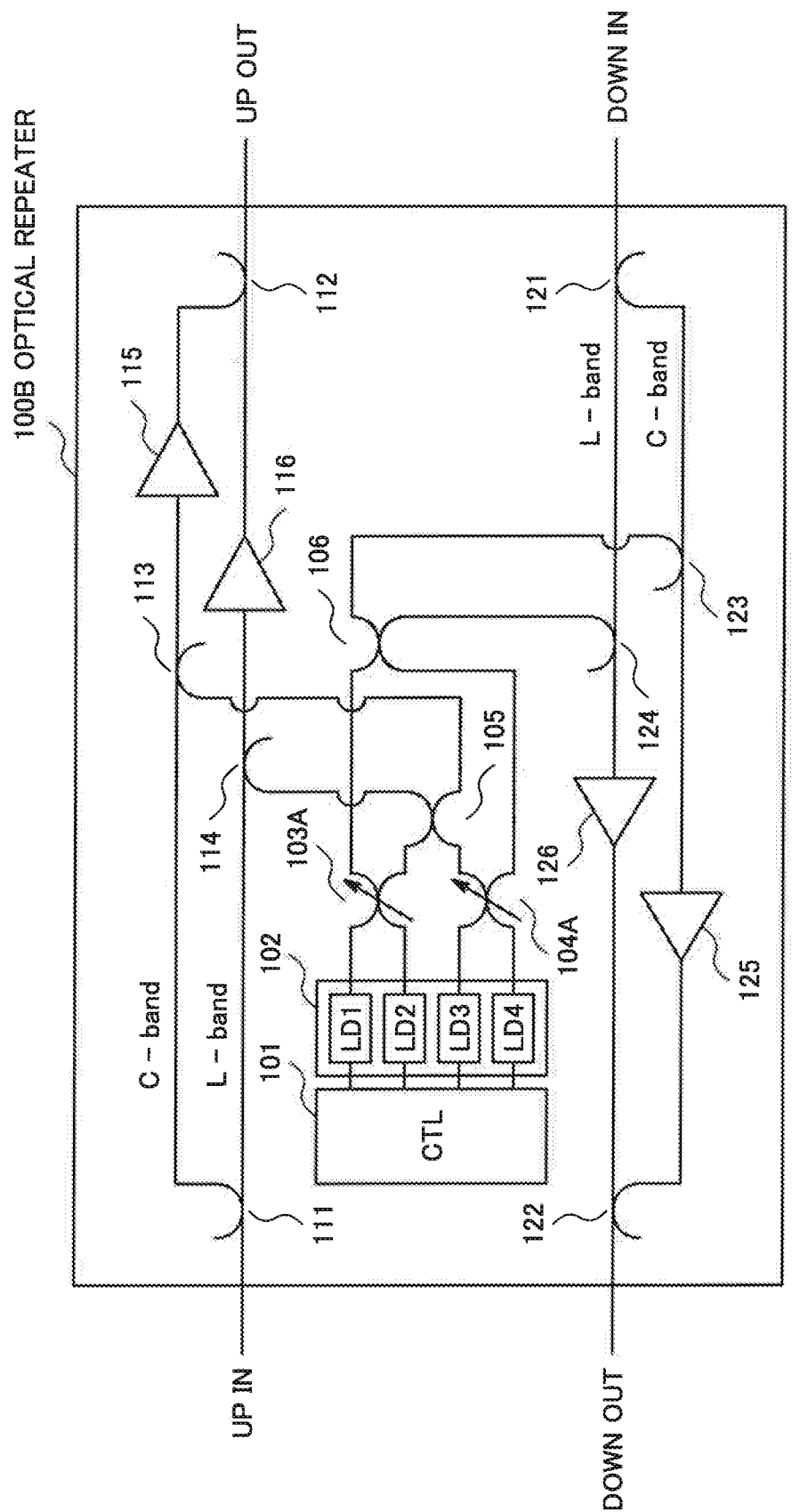
FIG. 3 is a block diagram illustrating a configuration example of an optical repeater 100B according to a third example embodiment.

FIG. 3 is a block diagram illustrating a configuration example of an optical repeater 100B according to the third example embodiment of the present invention. Similarly to the first and second example embodiments, the optical repeater 100B is used in an optical submarine cable system that makes amplification on wavelength bands of both a C-band and an L-band.

The optical repeater 100B differs from the optical repeater 100 according to the first example embodiment in including couplers 103A and 104A instead of the couplers 103 and 104. Since a configuration of the optical repeater 100B is the same as that of the optical repeater 100 except for the couplers 103A and 104A, description of the already described elements is appropriately omitted hereinafter.

The optical repeater 100B includes a control circuit 101, an excitation light source 102, couplers 103A to 104A and 105 to 106, multiplexer/demultiplexers 111 to 114 and 121 to 124, and optical amplification media 115 to 116 and 125 to 126.

Excitation light of an LD 1 and an LD 2 in the excitation light source 102 is coupled by the coupler 103A, and is distributed to the couplers 105 and 106. Excitation light of an LD 3 and an LD 4 is coupled by the coupler 104A, and is distributed to the couplers 105 and 106. The couplers 103A and 104A are similar to the couplers 105A and 106A of the second example embodiment, and are variable division-ratio couplers of which division ratios can be controlled from the outside. Division ratios of the couplers 103A and 104A may be controlled by an electric signal output from the control circuit 101.

The coupler 105 supplies excitation light to the optical amplification media 115 and 116 on the up line via the multiplexer/demultiplexers 113 and 114. The coupler 106 supplies excitation light to the optical amplification media 125 and 126 on the down line via the multiplexer/demultiplexers 123 and 124.

By controlling division ratios of the couplers 103A and 104A, power of the excitation light output by the excitation light source 102 can be distributed at ratios different between the up line and the down line. For example, when a distance from an output unit on the up line (UP OUT) to a next repeater is larger than a distance from an output unit on the down line (DOWN OUT) to a next repeater, the optical amplification media 115 and 116 on the up line require higher optical power (or gain) than that on the down line. In such a case, the optical repeater 100B according to the present example embodiment controls division ratios of the couplers 103A and 104A in such a way that the ratio on a side of the coupler 105 becomes larger, so that larger excitation light power output by the excitation light source 102 can be distributed to an up-line side. Note that when larger excitation light power can be distributed to the up-line side, division ratios of the couplers 103A and 104A may be controlled independently, or may be controlled in such a way as to become the same. Division ratios of the couplers 103A and 104A may be set based on actual use conditions, when the optical repeater 100B is installed. The actual use conditions may include output power and gain of the optical repeater, a distance to an adjacent repeater, and a loss of an optical transmission line. During operation of the optical repeater 100B, division ratios of the couplers 103A and 104A may be changed by the control circuit 101 that has received an instruction through a not-illustrated path from the outside of the optical repeater 100B.

The optical repeater 100B including such a configuration can supply excitation light power different between the up line and the down line, to optical amplification media of the same wavelength band. As a result, the optical repeater 100B can further attain excitation of the optical amplification media of the same wavelength band in conditions different between the up line and the down line, in addition to the advantageous effect of the optical repeater 100 according to the first example embodiment. For example, the optical repeater 100B can supply excitation light power suitable for each direction even when a distance to another optical repeater is different between the up line and the down line.

Modified Example of Third Example Embodiment

The configuration of the third example embodiment in which division ratios of the couplers 103A and 104A are controlled may be used together concurrently with the configuration of the second example embodiment in which division ratios of the couplers 105A and 106A are controlled. By using the couplers 103A to 106A of which division ratios are variable instead of the couplers 103 to 106, a distribution ratio of excitation light power can be adjusted between the optical amplification medium of the C-band and the optical amplification medium of the L-band, and a distribution ratio of excitation light power can be adjusted between the up line and the down line as well. In other words, with this configuration, the advantageous effects of both the second example embodiment and the third example embodiment can be attained.

Fourth Example Embodiment

Figure 4:
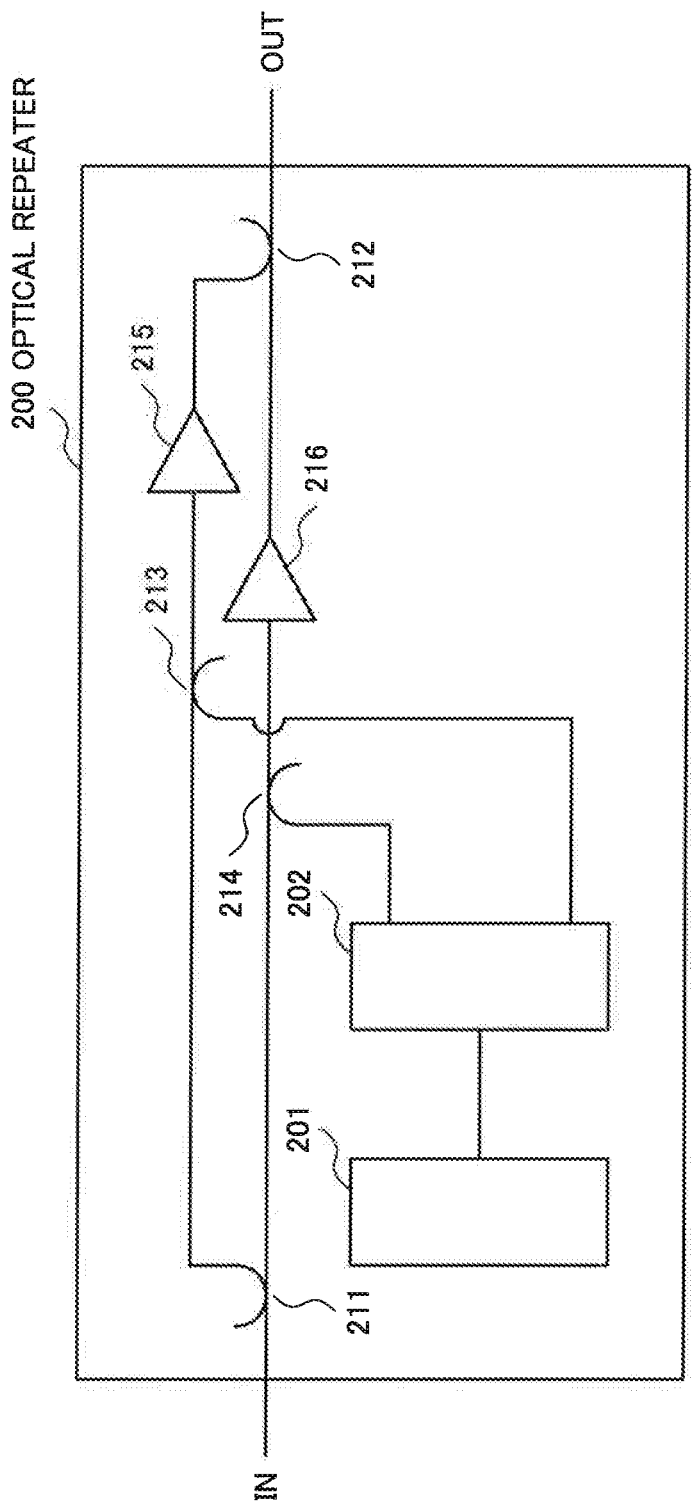
FIG. 4 is a block diagram illustrating a configuration example of an optical repeater 200 according to a fourth example embodiment.

FIG. 4 is a block diagram illustrating a configuration example of an optical repeater 200 according to a fourth example embodiment of the present invention. The optical repeater 200 amplifies signal light of a plurality of different wavelength bands. "IN" and "OUT" in FIG. 4 represents input and output of signal light, respectively. The optical repeater 200 includes an excitation light source 201, a coupler 202, multiplexer/demultiplexers 211 to 214, and optical amplification media 215 to 216.

The excitation light source 201 generates excitation light exciting the optical amplification media 215 to 216. The excitation light source 201 is used in common for amplification on different wavelength bands. The excitation light source 201 includes a laser diode, for example. The excitation light source 201 outputs excitation light of a single wavelength band which is 980 nm band, for example. The excitation light is input to the coupler 202. The coupler 202 distributes excitation light to the multiplexer/demultiplexers 213 and 214. The coupler 202 is a 1×2 optical coupler, for example.

The multiplexer/demultiplexers 211 and 212 make demultiplexing or multiplexing of signal light of a first wavelength band (for example, a C-band) and signal light of a second wavelength band (for example, an L-band). The multiplexer/demultiplexer 213 multiplexes signal light of the first wavelength band and excitation light. The multiplexer/demultiplexer 214 multiplexes signal light of the second wavelength band and excitation light.

The optical amplification medium 215 amplifies signal light of the first wavelength band with excitation light. The optical amplification medium 216 amplifies signal light of the second wavelength band with excitation light.

Figure 5:
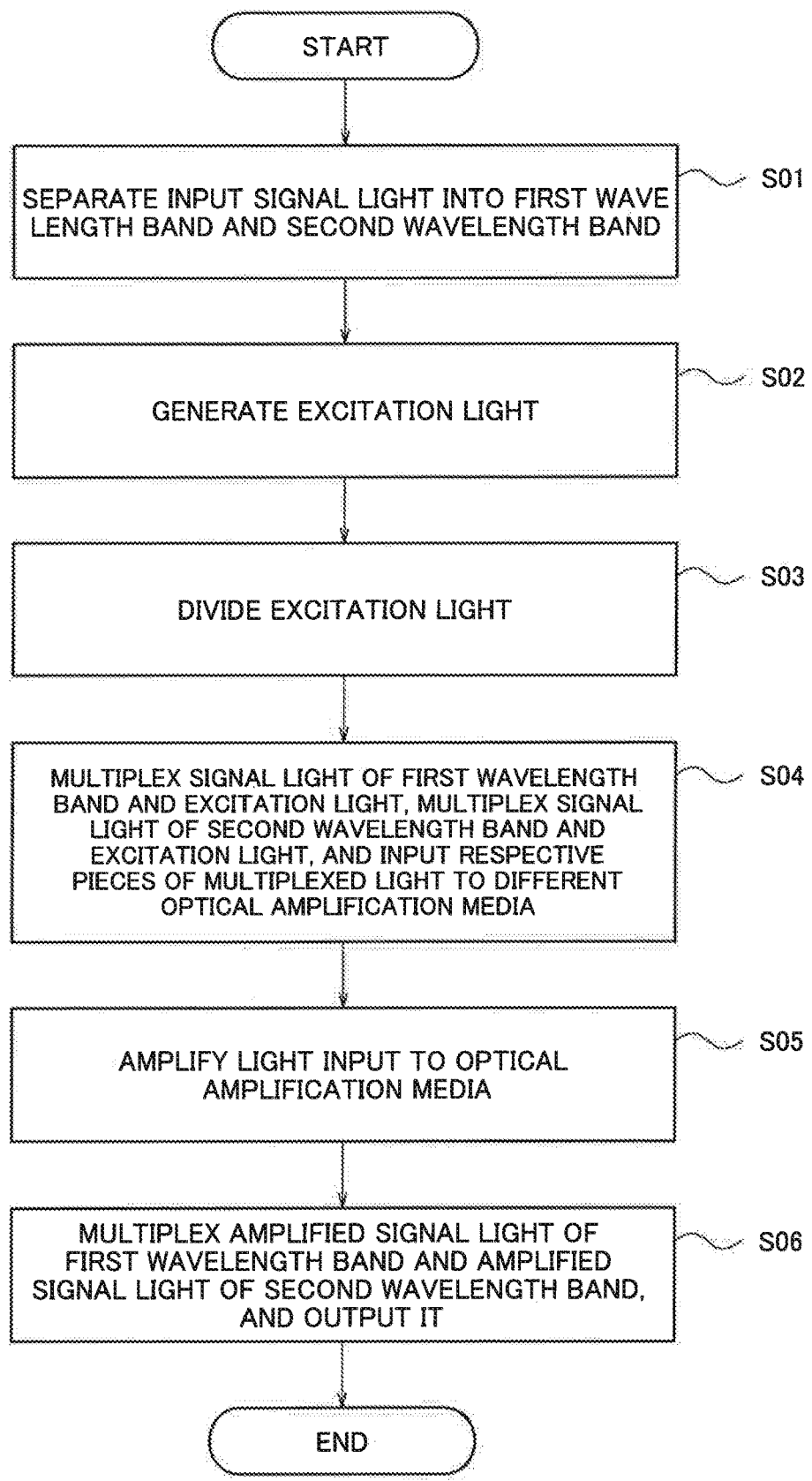
FIG. 5 is a flowchart illustrating an example of an operation procedure of the optical repeater 200.

FIG. 5 is a flowchart illustrating an operation example of the optical repeater 200. Hereinafter, an operation of the optical repeater 200 is described with reference to FIG. 5. The multiplexer/demultiplexer 211 separates input signal light into the first wavelength band and the second wavelength band (step S01 in FIG. 5). The excitation light source 201 generates excitation light (step S02). The coupler 202 divides the excitation light (step S03). The order of steps S01 to S03 is not limited to the above.

The multiplexer/demultiplexer 213 multiplexes the signal light of the first wavelength band and the excitation light output from one output of the coupler 202, and inputs the multiplexed light to the optical amplification medium 215. The multiplexer/demultiplexer 214 multiplexes the signal light of the second wavelength band and the excitation light output from the other output of the coupler 202, and inputs the multiplexed light to the optical amplification medium 216. In other words, the multiplexer/demultiplexer 213 multiplexes the signal light of the first wavelength band and the excitation light, and the multiplexer/demultiplexer 214 multiplexes the signal light of the second wavelength band and the excitation light. Then, the multiplexed light is input to the different optical amplification media, respectively (step S04).

The optical amplification medium 215 amplifies the signal light of the first wavelength band, and the optical amplification medium 216 amplifies the signal light of the second wavelength band (step S05). The multiplexer/demultiplexer 212 multiplexes the amplified signal light of the first wavelength band and the amplified signal light of the second wavelength band, and outputs the multiplexed light (step S06).

In the optical repeater 200 according to the fourth example embodiment, the same excitation light source 201 is used for amplification on the first wavelength band and amplification on the second wavelength band. For example, the optical amplification medium 216 for which an excitation light source of a wavelength band different from that of the excitation light source 201 is normally used is also excited by using the excitation light source 201 used for exciting the optical amplification medium 215. As a result, the optical repeater 200 can simultaneously amplify signal light of the first wavelength band and signal light of the second wavelength band, and uses the excitation light source 201 in common for the first and second wavelength bands, thereby enabling a size and power consumption of the optical repeater to be made smaller compared with those of a configuration in which excitation light sources are used for respective wavelength bands.

Another Expression of Fourth Example Embodiment

The advantageous effect of the optical repeater 200 according to the fourth example embodiment can be attained also by the following modified example. The reference signs of elements corresponding to those in FIG. 4 are written in parentheses. In other words, the modified example of the optical repeater 200 includes an excitation light source (201) and first and second optical amplification media (215 and 216). The excitation light source (201) is an excitation light source that generates excitation light of a single wavelength band. The first optical amplification medium (215) is an optical amplification medium that is excited by excitation light of the excitation light source (201) and of which amplification band is a first wavelength band. The second optical amplification medium (216) is an optical amplification medium that is excited by excitation light of the excitation light source (201) and of which amplification band is a second wavelength band. The amplification band of the second optical amplification medium (216) is different from the amplification band of the first optical amplification medium (215).

According to the modified example of the optical repeater 200 with such a configuration, signal light of the first wavelength band and signal light of the second wavelength band can be simultaneously amplified. By using the excitation light source (201) in common for the first and second wavelength bands, a size and power consumption of the optical repeater can be made smaller compared with those of a configuration in which excitation light sources are used for respective wavelength bands.

Although the invention of the present application is described above with reference to the example embodiments, the invention of the present application is not limited to the above-described example embodiments. Various modifications that can be understood by those skilled in the art can be made on a configuration and details of the invention of the present application, within the scope of the present invention.

Further, the configurations described in the respective example embodiments do not necessarily exclude each other. The function and the advantageous effect of the present invention can be achieved by a configuration made by combining all or a part of the above-described example embodiments.

The present application claims priority based on Japanese patent application No. 2015-190597 filed on Sep. 29, 2015, entire disclosure of which is incorporated herein.

REFERENCE SIGNS LIST 100, 100A, 100B, 200, 900 Optical repeater
91 C-band optical amplifier
92 L-band optical amplifier
101, 911, 921 Control circuit
102, 201, 912, 922 Excitation light source
103 to 106, 103A to 106A, 202 Coupler
111 to 114, 121 to 124, 211 to 214 Multiplexer/demultiplexer
115, 116, 125, 126, 215, 216, 913, 923 Optical amplification medium

What is claimed is:

1. An optical repeater comprising:
an excitation circuit configured to generate an excitation light of a single wavelength band;
a first optical amplification medium that is excited by the excitation light and of which amplification band is C-band;
a second optical amplification medium that is excited by the excitation light and of which amplification band is L-band;
a first dividing circuit configured to divide the excitation light into a first excitation light and a second excitation light;
a first separating circuit configured to separate a first signal light into a second signal light C-band and a third signal light of L-band;
a first multiplexer configured to multiplex the second signal light and the first excitation light, and output the multiplexed light to the first optical amplification medium;
a second multiplexer configured to multiplex the third signal light and the second excitation light, and output the multiplexed light to the second optical amplification medium;
a third multiplexer configured to multiplex the second signal light amplified by the first optical amplification medium and the third signal light amplified by the second optical amplification medium;
a controller configured to control the excitation circuit;
a second separating circuit configured to separate an input fourth signal light into a fifth signal light of C-band and a sixth signal light of L-band;
a second dividing circuit configured to divide the excitation light into a third excitation light and a fourth excitation light;
a third dividing circuit configured to divide the excitation light output from the excitation circuit, and outputting the divided excitation light into the first and second dividing circuit;
a third optical amplification medium that is excited by the third excitation light and of which amplification band is C-band;
a fourth optical amplification medium that is excited by the fourth excitation light and of which amplification band is L-band;
a fourth multiplexer configured to multiplex the fifth signal light and the third excitation light, and output the multiplexed light to the third optical amplification medium;
a fifth multiplexer configured to multiplex the sixth signal light and the fourth excitation light, and output the multiplexed light to the fourth optical amplification medium; and
a sixth multiplexer configured to multiplex the fifth signal light amplified by the third optical amplification medium and the sixth signal light amplified by the fourth optical amplification medium.

2. The optical repeater according to claim 1, wherein the controller controls a division ratio of the second dividing circuit.

3. The optical repeater according to claim 2, wherein the controller controls a division ratio of the third dividing circuit.

4. The optical repeater according to claim 2, wherein the first and third optical amplification medium amplify signal light of a wavelength band of a C-band, the second and fourth optical amplification medium amplify signal light of an L-band, and a wavelength of the excitation light is a band of 980 nm.

5. The optical repeater according to claim 1, wherein the controller controls a division ratio of the third dividing circuit.

6. The optical repeater according to claim 5, wherein the first and third optical amplification medium amplify signal light of a wavelength band of a C-band, the second and fourth optical amplification medium amplify signal light of an L-band, and a wavelength of the excitation light is a band of 980 nm.

7. The optical repeater according to claim 1, wherein the first and third optical amplification medium amplify signal light of a wavelength band of a C-band, the second and fourth optical amplification medium amplify signal light of an L-band, and a wavelength of the excitation light is a band of 980 nm.

8. An optical repeater comprising:
an excitation circuit configured to generate an excitation light of a single wavelength band;
a first optical amplification medium that is excited by the excitation light and of which amplification band is C-band;
a second optical amplification medium that is excited by the excitation light and of which amplification band is L-band;
a first dividing circuit configured to divide the excitation light into a first excitation light and a second excitation light;
a first separating circuit configured to separate the inputted first signal light into a second signal light C-band and a third signal light of L-band;
a first multiplexer configured to multiplex the second signal light and the first excitation light, and output the multiplexed light to the first optical amplification medium;
a second multiplexer configured to multiplex the third signal light and the second excitation light, and output the multiplexed light to the second optical amplification medium;
a third multiplexer configured to multiplex the second signal light amplified by the first optical amplification medium and the third signal light amplified by the second optical amplification medium;
a controller configured to control the excitation circuit, wherein the controller controls a division ratio of the first dividing circuit;

a second separating circuit configured to separate an input fourth signal light into a fifth signal light of C-band and a sixth signal light of L-band;
a second dividing circuit configured to divide the excitation light into a third excitation light and a fourth excitation light;
a third dividing circuit configured to divide the excitation light output from the excitation circuit, and outputting the divided excitation light into the first and second dividing circuit;
a third optical amplification medium that is excited by the third excitation light and of which amplification band is C-band;
a fourth optical amplification medium that is excited by the fourth excitation light and of which amplification band is L-band;
a fourth multiplexer configured to multiplex the fifth signal light and the third excitation light, and output the multiplexed light to the third optical amplification medium;
a fifth multiplexer configured to multiplex the sixth signal light and the fourth excitation light, and output the multiplexed light to the fourth optical amplification medium; and
a sixth multiplexer configured to multiplex the fifth signal light amplified by the third optical amplification medium and the sixth signal light amplified by the fourth optical amplification medium.

9. The optical repeater according to claim 8, wherein the controller controls a division ratio of the second dividing circuit.

10. The optical repeater according to claim 9, wherein the controller controls a division ratio of the third dividing circuit.

11. The optical repeater according to claim 8, wherein the controller controls a division ratio of the third dividing circuit.

12. A method comprising:
generating an excitation light of a single wavelength band, the excitation light exciting a first optical amplification medium having an amplification band that is C-band, and a second optical amplification medium that having an amplification band that is L-band;
dividing the excitation light into a first excitation light and a second excitation light;
separating a first signal light into a second signal light C-band and a third signal light of L-band;
multiplexing the second signal light and the first excitation light, and outputting the multiplexed light to the first optical amplification medium;
multiplexing the third signal light and the second excitation light, and outputting the multiplexed light to the second optical amplification medium;
multiplexing the second signal light amplified by the first optical amplification medium and the third signal light amplified by the second optical amplification medium;
separating a fourth signal light into a fifth signal light of C-band and a sixth signal light of L-band;
dividing the excitation light into a third excitation light and a fourth excitation light, the third excitation light exciting a third optical amplification medium having an amplification band that is C-band, the fourth excitation light exciting a fourth optical amplification medium that having an amplification band that is L-band;
multiplexing the fifth signal light and the third excitation light, and outputting the multiplexed light to the third optical amplification medium;
multiplexing the sixth signal light and the fourth excitation light, and outputting the multiplexed light to the fourth optical amplification medium; and
multiplexing the fifth signal light amplified by the third optical amplification medium and the sixth signal light amplified by the fourth optical amplification medium.

* * * * *